United States Patent

Mizzoni et al.

[11] 3,761,592
[45] Sept. 25, 1973

[54] QUINOLINE DERIVATIVES EXHIBITING GROWTH PROMOTING AND ANTICOCCIDIAL EFFECTS

[76] Inventors: Renat Herbert Mizzoni, 90 Valley Brook Road, Long Valley, N.J. 07853; George De Stevens, 2 Warwick Road, Summit, N.J.

[22] Filed: Oct. 14, 1969

[21] Appl. No.: 866,378

Related U.S. Application Data

[63] Continuation-in-part of Ser. No. 808,333, March 18, 1969, Pat. No. 3,496,184, which is a continuation-in-part of Ser. Nos. 736,962, June 14, 1968, abandoned, and Ser. No. 770,426, Oct. 24, 1968, abandoned, which is a continuation-in-part of Ser. No. 753,731, Aug. 19, 1968, abandoned, which is a continuation-in-part of Ser. No. 669,730, Sept. 22, 1967, abandoned, which is a continuation-in-part of Ser. No. 661,541, Aug. 18, 1967, abandoned, which is a continuation-in-part of Ser. No. 650,655, July 3, 1967, abandoned, which is a continuation-in-part of Ser. No. 629,085, April 7, 1967, abandoned, which is a continuation-in-part of Ser. No. 583,101, Sept. 29, 1966, abandoned.

[52] U.S. Cl. .............................................. 424/258
[51] Int. Cl. ............................................. A61k 27/00
[58] Field of Search ..................................... 424/258

[56] References Cited
UNITED STATES PATENTS

| | | | |
|---|---|---|---|
| 3,178,348 | 4/1965 | Bickerton | 424/258 |
| 3,290,315 | 12/1966 | Watson | 424/258 |
| 3,377,352 | 4/1968 | Clark et al. | 424/258 |
| 3,397,208 | 8/1968 | Berman et al. | 424/258 |
| 3,414,576 | 12/1968 | Cairns et al. | 424/258 |

Primary Examiner—Sam Rosen
Attorney—Harry Goldsmith, Joseph G. Kolodny and Mario A. Monaco

[57] ABSTRACT

Cycloaliphatyloxy- or -mercapto-4-hydroxy-3-quinoline-carboxylic acids, e.g. those of the formula

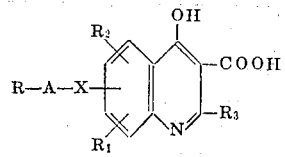

R = cycloaliphatic radical
$R_{1,2}$ = H, alkyl, alkenyl, aralkyl, free, etherified or esterified OH or SH, $CF_3$, $NO_2$ or amino
A = direct bond or aliphatic radical
$R_3$ = H or alkyl
X = O or S functional derivatives, tautomeric N-derivatives and salts thereof, exhibit anticoccidial and growth promoting effects.

14 Claims, No Drawings

QUINOLINE DERIVATIVES EXHIBITING GROWTH PROMOTING AND ANTICOCCIDIAL EFFECTS

CROSS-REFERENCES TO RELATED APPLICATIONS

This is a continuation-in-part of application Ser. No. 808,333 filed Mar. 18, 1969 (now U.S. Pat. No. 3,496,184), which is a continuation-in-part of application Ser. No. 736,962 filed June 14, 1968 and of application Ser. No. 770,426 filed Oct. 24, 1968, which latter is a continuation-in-part of application Ser. No. 753,731 filed Aug. 19, 1968, which in turn is a continuation-in-part of application Ser. No. 669,730 filed Sept. 22, 1967, which in turn is a continuation-in-part of application Ser. No. 661,541 filed Aug. 18, 1967, which in turn is a continuation-in-part of application Ser. No. 650,655 filed July 3, 1967, which in turn is a continuation-in-part of application Ser. No. 629,085 filed Apr. 7, 1967, which in turn is a continuation-in-part of application Ser. No. 583,101 filed Sept. 29, 1966, all of which, except Ser. No. 808,333, are now abandoned.

SUMMARY OF THE INVENTION

The present invention concerns and has for its object the provision of new cycloaliphatyloxy- or -mercapto-4-oxygenated- 3-quinolinecarboxylic acids, more particularly of those represented by Formula I, (defining said compounds in their tautomeric form)

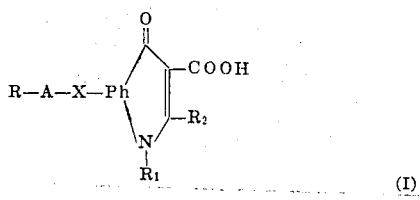

in which R is a cycloaliphatic radical, A is a direct bond or a bivalent aliphatic radical, X is oxygen or sulfur, Ph is a 1,2-phenylene radical substituted in one of the remaining four positions by R—A—X, $R_1$ is hydrogen, lower alkyl, alkenyl, free, etherified or esterified hydroxy- or carboxyalkyl, aminoalkyl, R—A— or aralkyl and $R_2$ is hydrogen or lower alkyl, of their esters, amides, hydrazides, the nitrile and salts, of corresponding veterinary compositions, feedstuffs, and feedstuff additives, as well as of methods for the preparation and application of these products. Said compositions, feedstuffs, additives or drinking water containing the compounds of the invention alone, or in combination with other therapeutically valuable agents, are useful as growth promotors, as well as in the control of coccidiosis, which latter is of utmost importance for the poultry raising industry.

DESCRIPTION OF THE PREFERRED EMBODIMENTS

The term "lower," referred to above and hereinafter in connection with organic radicals or compounds respectively, defines such with up to seven, preferably up to four carbon atoms. The term "higher" defines such radicals or compounds with eight to 20, preferably eight to 16 carbon atoms. Accordingly, lower alkyl, which may be straight or branched and connected with the remaining molecule in any position, is represented, for example, by methyl, ethyl, n- or i-propyl, -butyl, -pentyl, -hexyl or -heptyl. A higher alkyl may also be straight or branched and connected in any position and is represented, for example, by 1- or 2-n-octyl, -nonyl, -decyl, -undecyl, -dodecyl, -tetradecyl, -hexadecyl, -octadecyl or -dodecyl, 3,7-dimethyl-1- or 3-n-octyl, 3,7,11-trimethyl-1- or 3-n-dodecyl. Lower alkenyl is, for example, allyl, methallyl or but-2-enyl, and higher alkenyl, for example, citronellyl, geranyl, neryl, linalyl, farnesyl, n-9-octadecenyl or phytyl.

A cycloaliphatic radial representing R, more particularly contains three to eight ring-carbon atoms and preferably stands for cycloalkyl, primarily with three to six ring-carbon atoms, or cycloalkenyl, primarily with five to six ring-carbon atoms and up to two double bonds, such as cyclopropyl, cyclobutyl, cyclopentyl or cyclohexyl, but also cycloheptyl or cyclooctyl; 1-, 2- or 3-cyclopentenyl or -cyclohexenyl, 2,4-cyclopentadienyl or 2,5-cyclohexadienyl, but also 2-cyclopropenyl, 1-, 2- or 3-cyclo-heptenyl, 2,6-cycloheptadienyl or 2-cyclooctenyl.

Said cycloaliphatic radical R, as well as the 1,2-phenylene radical Ph, is unsubstituted or substituted, for example, by aliphatic or araliphatic radicals and/or free, esterified or etherified hydroxy groups, R also by aromatic radicals and Ph furthermore by trifluoromethyl, nitro and/or amino groups. Accordingly, the above-mentioned cycloaliphatic radical R may be substituted, preferably by up to 4 lower alkyl groups, e.g. those mentioned above, but also by ($R_3$-phenyl)-lower alkyl, $R_3$-phenyl, hydroxy, lower alkanoyloxy, e.g. acetoxy or propionyloxy, primarily halogeno, e.g. fluoro, chloro or bromo, lower alkoxy, e.g. methoxy, ethoxy, n- or i-propoxy or -butoxy, ($R_3$-phenyl)-lower alkoxy, $R_3$-phenoxy, hydroxy-lower alkyl, lower alkanoyloxy-lower alkyl, halogeno-lower alkyl or lower alkoxy-lower alkyl groups, wherein $R_3$ stands for hydrogen, lower alkyl, lower alkoxy, halogeno, trifluoromethyl, nitro or di-lower alkylamino, e.g. dimethylamino or diethylamino.

Preferred substituted cycloaliphatic radicals R are exemplified by 1- or 2-methyl-cyclopropyl, 1,2-, 2,2- or 2,3-dimethyl-cyclopropyl, 1,2,2- or 1,2,3-trimethyl-cyclopropyl, 2,2,3, 3-tetramethyl-cyclopropyl, 2-ethyl-cyclopropyl, 2,2,3-trimethylcyclobutyl, 3-ethyl-cyclobutyl, 2- or 3-methyl-cyclopentyl, 2,5- or 3,4-dimethyl-cyclopentyl, 2-, 3- or 4-methyl-cyclohexyl, 2,3-, 2,4- or 3,5-dimethyl-cyclohexyl, 2,4,6-trimethyl-cyclohexyl, 1- or 2-benzyl-cyclopropyl, 1- or 2-phenyl-cyclopropyl, 2-chlorocyclopropyl, 2,2-dichloro-cyclopropyl, 3,4-dichloro-cyclopentyl, 2-ethoxy-cyclopropyl, 2-benzyloxy-cyclopropyl, 2-phenoxy-cyclopropyl, 1-acetoxymethyl-cyclopropyl, 1-chloromethyl-cyclopropyl or 1-methoxymethyl-cyclopropyl; 2- or 3-methyl-2-cyclopentenyl, 4,5-dimethyl-2-cyclopentenyl, 2-, 3- or 4-methyl-1- or 2-cyclo-hexenyl, 2,4- or 3,5-dimethyl-1- or 2-cyclohexenyl, or 2,4,6-trimethyl-2,5-cyclohexadienyl.

A bivalent aliphatic radical representing A is primarily lower alkylene, preferably such with up to four carbon atoms. It may be mono- or polysubstituted as shown above for the cycloaliphatic moiety. It especially represents methylene, but also 1,1- or 1,2-ethylene, 1,1-, 1,2-, 2,2- or 1,3-propylene, 2-methyl-1,3-butylene or 1,4-butylene.

The 1,2-phenylene radical Ph is unsubstituted in the remaining three positions or substituted therein, for example, by 1 or 2 members selected from lower alkyl, higher alkyl, lower alkenyl, higher alkenyl, ($R_3$-phenyl)-lower alkyl, hydroxy, lower alkanoyloxy, halogeno, lower alkoxy, ($R_3$-phenyl)-lower alkoxy or $R_3$-phenoxy groups which have been illustrated above but also by mercapto, higher alkoxy, lower or higher alkenyloxy, alkylmercapto or alkenylmercapto groups, such as, 1- or 2-n-octyloxy, n-decyloxy, n-dodecyloxy, n-tetradecyloxy or n-hexadecyloxy, allyloxy, methallyloxy or citronellyloxy, methyl-, ethyl- or allylmercapto; lower halo-alkoxy or -alkylmercapto, e.g. 2-chloroethoxy, 3,3,3-trifluoropropoxy or 3-bromopropylmercapto, ($R_3$-phenyl)-lower alkylmercapto, e.g. ($R_3$-phenyl)-methyl- or -ethyl-mercapto, $R_3$-phenylmercapto, the group R—A—X, ($R_3$-phenyl)-lower alkanoyloxy, e.g. benzoyloxy or phenylacetoxy, trifluoromethyl, nitro or amino, preferably di-lower alkylamino or lower alkanoyl-amino, e.g. dimethylamino or diethylamino, acetylamino or propionylamino.

Of the 1,2-phenylene radicals Ph containing the R—A—X moiety, the following are preferred: 1,2-phenylene, (lower alkyl)-1,2-phenylene, (higher alkyl)-1,2-phenylene, (lower alkenyl)-1,2-phenylene, (higher alkenyl)-1,2-phenylene, ($R_3$-phenyl-lower alkyl)-1,2-phenylene, (hydroxy)-1,2-phenylene, (mercapto)-1,2-phenylene, (lower alkanoyloxy)-1,2-phenylene, ($R_3$-phenyl-lower alkanoyloxy)-1,2-phenylene, (halogeno)-1,2-phenylene, (lower alkoxy)-1,2-phenylene, (higher alkoxy)-1,2-phenylene, (lower alkenyloxy)-1,2-phenylene, (higher alkenyloxy)-1,2-phenylene, (lower alkylmercapto)-1,2-phenylene, (higher alkylmercapto)-1,2-phenylene, (lower alkenylmercapto)-1,2-phenylene, (higher alkenylmercapto)-1,2-phenylene, (halo-lower alkoxy)-1,2- (halo-lower alkylmercapto)-1,2-phenylene, ($R_3$-phenyl-lower alkoxy)-1,2-phenylene, ($R_3$-phenyl-lower alkylmercapto)-1,2-phenylene, ($R_3$-phenoxy)-1,2-phenylene, ($R_3$-phenylmercapto)-1,2-phenylene, (trifluoromethyl)-1,2-phenylene, (nitro)-1,2-phenylene, (di-lower alkylamino)-1,2-phenylene, (lower alkanoylamino)-1,2-phenylene and especially (R—A—X)-1,2-phenylene. In said 1,2-phenylene radicals, the R—A—X and additional moiety preferably occupy the 4- or 5- positions therein.

A lower alkyl radial representing $R_1$ and $R_2$ as well as a lower alkenyl, R-A- and aralkyl e.g. ($R_3$-phenyl)-lower alkyl radical representing $R_1$ also, have been exemplified above. The remaining radicals mentioned for $R_1$ can be represented by $R_4$-lower alkyl, wherein $R_4$ stands for hydroxy, lower alkoxy, carboxy or carbo-lower alkoxy, e.g. carbomethoxy or carbethoxy, amino, mono- or di-lower alkylamino, e.g. methylamino, ethylamino, n-propylamino, dimethylamino or diethyl-amino, lower alkyleneimino or mono-aza-, oxa- or thia-lower alkyleneimino, wherein the hetero-atoms are separated by at least two carbon atoms, e.g. ethyleneimino, pyrrolidino, piperidino, piperazino, 4-methyl- or 4-ethyl-piperazino, morpholino or thiamorpholino.

An ester is derived either from the carboxylic acid of Formula I, which is preferably a lower or higher alkyl or aralkyl, e.g. ($R_3$-phenyl)-lower alkyl ester, such as the methyl, ethyl, n- or i-propyl or -butyl, n-decyl, benzyl, 1- or 2-phenethylester thereof; or from the tautomeric 4-phenol, which is preferably a lower alkanoic acid, e.g. acetic, propionic or pivalic acid ester thereof. An amide or hydrazide of said carboxylic acid is either N-unsubstituted, partially or fully N-substituted by lower alkyl or aralkyl, e.g. ($R_3$-phenyl)-lower alkyl groups.

The compounds of this invention possess valuable pharmacological properties. For example, they exhibit growth promoting, antibacterial and antiprotozoal effects in poultry. They especially show activity against parasites causing coccidiosis, such as *Eimeria tenella, acervulina, adenoides, agridis, brunetti, hagani, maxima* and *necatrix*. This can be demonstrated, for example, by the growth promoting effect of a feed containing about 0.0001 to about 0.1 percent of the compounds of this invention, given to chickens during a part of or the whole life span, or by the prophylactic or curative effect of said feed given to chickens 1 to 2 days prior or after their inoculation with sporulated oocysts of said Eimeria strains. Besides the above-mentioned utility, the compounds of this invention are also useful intermediates in the manufacture of other valuable products, particularly of pharmacologically active compounds.

Valuable compounds of the invention are those of Formula II

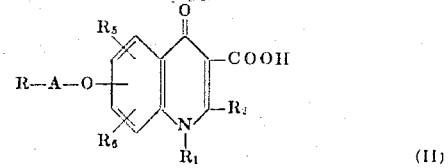

(II)

in which R is 3 to 8 ring-membered $(R_7)_n$-cycloalkyl wherein $R_7$ is hydrogen, lower alkyl or halogeno and n the integer 1 or 2, A is a direct bond or lower alkylene, each of $R_5$ and $R_6$ is hydrogen, or both, or preferably one thereof, is lower alkyl, higher alkyl, ($R_3$-phenyl)-lower alkyl, lower alkoxy, higher alkoxy, haloalkoxy with 2 to 7 carbon atoms and at most 3 halogen atoms, ($R_3$-phenyl)-lower alkoxy, $R_3$-phenoxy, $(R_7)_n$-cycloalkoxy, [$(R_7)_n$-cycloalkyl]-lower alkoxy, halogeno, trifluoromethyl, nitro or di-lower alkyl-amino, wherein $R_3$ has the previously given meaning, $R_1$ is hydrogen, lower alkyl, hydroxy-lower alkyl or di-lower alkyl-amino-lower alkyl, wherein the heteroatoms are separated by at least two carbon atoms and $R_2$ is hydrogen or lower alkyl, their lower alkyl esters, higher alkyl esters, ammonium, alkali metal, alkaline earth metal or acid addition salts, or lower alkanoic acid esters of the tautomeric 4-phenols. Preferably $R_5$ is hydrogen and R-A-O and $R_6$ occupy the 6- and 7-positions.

Particularly useful are compounds of the Formula III

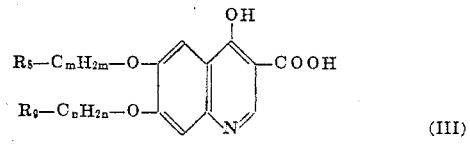

(III)

in which both of $R_8$ and $R_9$ stand for the same three to six ring-membered cycloalkyl or (lower alkyl)-cycloalkyl group and each of m and n for the same integer from one to four, as well as those in which both for $R_8$ and $R_9$ stand for said cycloalkyl or (lower alkyl)-cycloalkyl group and each of m and n stands for the integer 0, and those in which one of $R_8$ and $R_9$ stands for hydrogen and the other for said cycloalkyl or (lower alkyl)-cycloalkyl group and each of m and n for an integer from 1 to 4, and those in which one of $R_8$ and $R_9$ stands for $R_3$-phenyl and the other for said cycloalkyl or (lower alkyl)-cycloalkyl group and each of m and n for an integer from one to four, and those in which one of $R_8$ and $R_9$ stands for halogeno and the other for said cycloalkyl or (lower alkyl)-cycloalkyl group, the one of m and n present in the haloalkyl moiety for an integer from two to four whereby the halogen atom is separated from the oxygen atom by at least two carbon atoms, and the other for an integer from one to four, and those in which one of $R_8$ and $R_9$ stands for hydrogen and the other for said cycloalkyl or (lower alkyl)-cycloalkyl group, the one of m and n present in the alkyl group for an integer from five to seven or preferably eight to 16 and the other for an integer from one to four, a lower alkyl or 4-alkanoic acid ester, ammonium, alkali or alkaline earth metal or acid addition salt thereof.

Another group of valuable compounds are those of the Formula IV

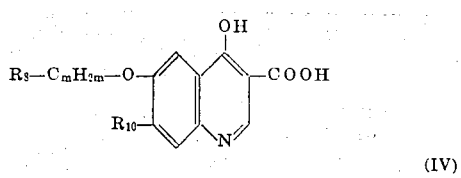

(IV)

in which $R_8$ stands for three to six ring-membered cycloalkyl or (lower alkyl)-cycloalkyl, m for an integer from one to four and $R_{10}$ for lower alkyl or di-lower alkylamino, a lower alkyl or 4-alkanoic acid ester, ammonium, alkali or alkaline earth metal or acid addition salt thereof.

Preferred compounds of the invention are those of Formula III, in which both of $R_8$ and $R_9$ stand for cyclopropyl and both of m and n for the same integer from one to four, as well as those of Formula III, in which one of $R_8$ and $R_9$ stands for hydrogen and the other for cyclopropyl, the one of m and n present in the alkyl group for an integer from one to seven or preferably eight to 16 and the other for the integer one, as well as those of Formula IV, in which $R_8$ is cyclopropyl, m is the integer 1 and $R_{10}$ is lower alkyl or di-lower alkylamino, a lower alkyl ester, ammonium, alkali metal, alkaline earth metal or acid addition salt thereof.

Of special value are the methyl or ethyl esters of the 6,7-bis-cyclopropylmethoxy-4-hydroxy-3-quinolinecarboxylic acid, the 6-cyclopropylmethoxy-7-n-(octyloxy, decyloxy, dodecyloxy or tetradecyloxy)-4-hydroxy-3-quinolinecarboxylic acid, the 6-cyclopropylmethoxy-7-n-butyl-4-hydroxy-3-quinolinecarboxylic acid or the 7-cyclopropylmethoxy-6-n-(nonyl or decyloxy)-4-hydroxy-3-quinolinecarboxylic acid or their 4-acetic acid esters, which, when given with a balanced diet at a level between about 0.0001 and 0.01 percent, preferably between about 0.004 and 0.008 percent, to healthy or infected chickens, (for example, with the above Eimeria strains) cause outstanding weight gain and feed conversion index, as well as an outstanding prophylactic and curative effect.

The compounds of this invention are prepared according to known methods. For example, the process for their preparation consists in a. ring-closing a reactive functional derivative of a (cycloaliphatyloxy or -mercapto-phenylamino)-alkylidene-malonic acid unsubstituted in one ortho-position, more particularly such of the formula

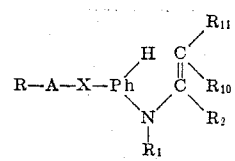

in which each of $R_{10}$ and $R_{11}$ is a functionally converted carboxy group, both containing at least one oxygen atom, preferably a carbalkoxy or carbaralkoxy group, and, if desired, converting any resulting compound into another compound within the scope of the invention.

A reactive functional acid derivative mentioned under item a is, for example, an ester, preferably a lower or higher alkyl or aralkyl ester, e.g. the methyl, ethyl n-propyl, butyl, decyl or benzyl ester, furthermore a halide, anhydride unsubstituted or alkyl- or aralkyl-substituted amide or hydrazide or the nitrile.

The above-mentioned reactions are carried out according to standard methods, e.g. according to the classical Gould-Jacobs synthesis, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure. Condensing agents usually must not be used in reaction a), which advantageously is carried out at an elevated temperature, preferably between about 240° and 260°.

Resulting compounds of the invention may be converted into each other according to known methods. For example, compounds that contain free hydroxy or mercapto in the isocyclic ring, may be esterified or etherified, advantageously by reaction with haloalkenes in order to obtain corresponding haloalkoxy compounds. Resulting esters, e.g. lower alkyl or aralkyl esters of the acids or lower alkanoic acid esters of the 4-phenols, may be hydrolized, for example, with the use of acidic or alkaline hydrolyzing agents, e.g. aqueous alkali metal hydroxides, or transesterified, in the absence or presence of acidic or basic catalysts, e.g. lower alkoxides, or the former converted into acid amides or hydrazides by reaction with ammonia, amines or hydrazines, preferably lower alkylamines or -hydrazines. Free acids that are obtained, may be esterified or amidated, for example, via acid halides or anhydrides, (which may be obtained by reaction with thionyl halides or ketenes) or with the use of corresponding dioxo compounds. Resulting 1-unsubstituted compounds may be N-substituted, for example with the use of reactive esters of corresponding alcohols, e.g. those of hydrohalic, sulfuric or sulfonic acids, advantageously in alkaline media or with corresponding epoxides, or O-substituted with reactive acid derivatives, advantageously with lower alkanoic acid anhydrides or ketenes, to yield the 4-lower alkanoyloxy derivatives.

The compounds of the invention are obtained in the free form or in the form of their salts, depending on the conditions under which the process is carried out; the salts are also included in the present invention. Salts that are obtained can be converted into free acids or bases respectively in known manner, for example, with acids, alkalis or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethane-sulfonic, hydroxyethanesulfonic, ethylenesulfonic, halogen-benzenesulfonic, toluenesulfonic, naphthalenesulfonic and sulfanilic acid; methionine, tryptophane, lysine and arginine. Free acids that are obtained, may be converted into ammonium or metal salts, preferably such of ammonia, aliphatic amines, alkali or alkaline earth metals, e.g. lower alkylamines, sodium, potassium, magnesium or calcium.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free compound is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the process of the invention that lead to the formation of those compounds indicated above as being specially valuable.

The starting material used in known or, if new, may be prepared according to known methods. For example, that used in reaction a) may be prepared by condensing a cycloaliphatyloxy- or -mercapto-aniline with a functional lower alkoxyalkylidene-malonic acid derivative, preferably a lower alkyl ester thereof, or by reaction of a corresponding N-cycloaliphatyloxy- or -mercapto-phenyl-N'-aryl-alkanoic acid amidine with a malonic acid derivative, e.g. ester or amide.

The compounds of the invention can be used, for example in the form of veterinary compositions, animal feedstuffs or additives to feedstuffs, which are a further object of the present invention. The former contain said compounds in conjunction or admixture with inorganic or organic, solid or liquid pharmaceutical excipients suitable especially for enteral administration. Suitable excipients are substances that do not react with the compounds of the invention, for example, water, gelatine, gums, sugars, e.g. lactose, glucose or sucrose, starches, e.g. corn starch or arrowroot, stearic acid or salts thereof, e.g. magnesium or calcium stearate, talc, alcohols, e.g. stearyl or benzyl alcohol, propylene glycol or polyalkylene glycols, alginic acid and other known medicinal excipients. The compositions may be, for example, tablets or pills, e.g. micropills, or in liquid form as solutions, suspensions or emulsions. They may be sterilized and/or contain adjuvants, such as preserving, stabilizing, wetting or emulsifying agents, solution promoters, salts for regulating the osmotic pressure or buffers. They are prepared by conventional methods and contain about 0.1 to 75 percent, more particularly, 1 to 50 percent, of the active ingredient.

The feedstuffs and additives for feedstuffs or for the drinking water contain the compounds of the invention together with conventional extenders, diluents and/or nutrients, such as sucrose, glucose, molasses, fermentation residues, cornmeal, ground and rolled oats, wheat shorts and middlings, meat scrap, oil cake, soy-bean and fish meal, alfalfa, clover, grass clippings and the like, mineral supplements, such as bonemeal, calcium carbonate, iodized salt and the like, vitamins, such as vitamins A, B, C and D, and other suitable substances, such as preservants, e.g. benzoic acid. They contain the compounds of the invention in an amount ranging between about 0.0001 and 0.1 percent, preferably between about 0.001 and 0.02 percent, whereas the additives may contain the pure substances, when used, for example, for the drinking water, but usually contain between about 1 and 75 percent, preferably 1 and 50 percent, thereof. The amount of the compounds of the invention administered via the veterinary compositions or the drinking water corresponds to that given with the medicated feedstuffs shown above. The veterinary compositions, feedstuffs and additives may contain one or more than one of other therapeutically valuable substances, for example, sulfonamides, especially N'-(6-chloro-2-pyrazinyl)-sulfanilamide, or N'-(2-quinoxalinyl)-sulfanilamide, but also N'-(2,6-dimethoxy-4-pyrimidyl)-sulfanilamide, N'-(5-ethyl-1,3,4-thiadiazol-2-yl)-sulfanilamide, N'-(5-methyl-3-isoxazolyl)-sulfanilamide, N'(6-methoxy-3-pyridazinyl)-sulfanilamide and the N'-acetyl derivative thereof, N'-(4-methyl-2-pyrimidinyl)-sulfanilamide, N'-(2,6-dimethyl-4-pyrimidinyl)-sulfanilamide, N'-(5-methyl-1,3,4-thiadiazol-2-yl)-sulfanilamide, N'-(6-chloro-3-pyridazinyl)-sulfanilamide and the sodium salt thereof, N'-(2-phenyl-3-pyrazolyl)-sulfanilamide, N'-(2-phenyl-5-methyl-3-pyrazolyl)-sulfanilamide and the like, arsenic derivatives, e.g. 3-nitro-4-hydroxyphenylarsonic acid or arsanilic acid, antibiotics, such as penicillin, e.g. procaine penicillin, streptomycin, aureomycin, terramycin, tetracyclines, e.g. oxytetracycline, or chlortetracycline, bacitracines, e.g. zinc or manganese bacitracin or bacitracin methylene disalicylate, antiparasitic agents, e.g. methyl-4-acetamino-2-ethoxybenzoate, 2-amino-5-nitrothiazole, 1-(5-nitrothiazolyl-2)-2-oxo-tetrahydro-imidazole, 6,7-dialkoxy-4-hydroxy-3-quinolinecarboxylic acids or their lower alkyl esters and/or tranquilizers, such as reserpine, methyl 18-epi-0-methyl-reserpate, meprobamate and the like, and/or a compound of U.S. Pat. No. 3,385,857 or U.S. Pat. No. 3,454,575, both of which cover quaternary 5-ammoniummethyl-4-amino-2-cycloaliphatylpyrimidine salts, e.g. the 2-cyclopropyl- or 2-cyclopropylmethyl-4-amino-5-(2,4-dimethyl-pyridinium)-methyl-pyrimidine chloride hydrochloride.

A preferred additive is such containing about 15 percent of a compound of the invention, preferably the 6,-7-bis-cyclopropyl-methoxy-4-hydroxy-3-quinolinecarboxylic acid ethyl ester or the 6-cyclopropylmethoxy-7-n-decyloxy-4-hydroxy-3-quinolinecarboxylic acid ethyl ester, advantageously in micronized form, alone or, if desired, in adjunction with some of the following growth promoters, in order to obtain a balanced feed containing between about 0.-0001 and 0.1%, preferably about 0.004 to 0.008 percent of said active ingredients and optionally about a. 0.0025–0.005 percent 3-nitro-4-hydroxyphenylarsonic acid,
b. about 0.005–0.01 percent arsanilic acid,
c. about 2–50g/ton procaine penicillin,
d. about 4–50 g/ton zinc bacitracin or bacitracin methylene disalicylate,
e. about 0.0025–0.005 percent 3-nitro-4-hydroxyphenylarsonic acid and about 0.00004–0.006 percent bacitracin,
f. about 0.00006–0.0009 percent procaine penicillin and 0.003–0.005 percent bacitracin or zinc bacitracin.

The following examples are intended to illustrate the invention and are not to be construed as being limitations thereon. Temperatures are given in degrees Centigrade, and all parts wherever given are parts by weight.

EXAMPLE 1

The mixture of 19.0 g diethyl (3,4-bis-cyclopropyl-methoxy-phenylamino)-methylene-malonate and 95 ml diphenyl ether is refluxed for 3 hours. It is cooled, diluted with n-hexane and filtered. The residue is washed with n-hexane and recrystallized from dimethylformamide to yield the 6,7-bis-cyclopropylmethoxy-4-hydroxy-3-quinolinecarboxylic acid ethyl ester of the formula

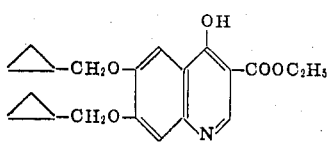

melting at 288°–288.5° with decomposition.

The starting material is prepared as follows: To the stirred and chilled mixture of 20.5 g 4-nitro-pyrocatechol and 40 ml 95 percent ethanol, the solution of 12.0 g sodium hydroxide in 20 ml water is added and the mixture kept under nitrogen. After 15 minutes the mixture is poured into about 10 times of its volume of acetone. The precipitate formed is filtered off quickly and washed with acetone. After a short period of drying in vacuo, the residue is dissolved in 900 ml dimethyl sulfoxide and to the solution 46.5 g cyclopropylmethyl bromide (84.5 percent pure) are added at 50°–55° while under nitrogen. The reaction mixture is allowed to stand for 6 hours at 60° then cooled and poured into ice water. The precipitate formed is filtered off, washed with water and recrystallized from isopropanol to yield the 3,4-bis-cyclopropyl-methoxy-nitrobenzene melting at 79°–81°.

16.5 g thereof in 210 ml anhydrous ethanol are hydrogenated in the presence of 2.0 g 10 percent palladium-carbon. After the hydrogen uptake has ceased, the mixture is filtered, to the filtrate 16.0 g diethyl ethoxymethylene-malonate are added and the mixture is refluxed for 6 hours under nitrogen. It is filtered, the filtrate evaporated in vacuo and the residue recrystallized from petroleum ether to yield the diethyl (3,4-bis-cyclopropylmethoxy-phenylamino)-methylene-malonate melting at 62°–64°.

EXAMPLE 2

Additive for drinking water:

| | |
|---|---|
| 6,7-bis-cyclopropylmethoxy-4-hydroxy-3-quinolinecarboxylic acid ethyl ester | 30.00 g |
| Tetrasodium ethylenediamine-tetracetic acid | 30.00 g |
| Citric acid | 70.00 g |
| Sodium citrate | 50.00 g |
| Confectioners sugar | 120.00 g |

An aqueous solution containing 0.01 percent of the active ingredient may be prepared from said additive.

EXAMPLE 3

A poultry feed containing 0.005 percent of the active ingredient is prepared as follows:

Feed Formula:

| | |
|---|---|
| 6,7-bis-cyclopropylmethoxy-4-hydroxy-3-quinolinecarboxylic acid ethyl ester | 50.00g |
| | Pounds |
| Corn meal | 1103.0 |
| Soybean meal, 44% protein | 660.0 |
| Alfalfa meal | 30.0 |
| Dicalcium phosphate | 40.0 |
| Limestone meal | 10.0 |
| Salt | 5.0 |
| Fish meal, 60% protein | 40.0 |
| Stabilized fat | 60.0 |
| Dried whey | 40.0 |
| Manganese sulfate | 0.5 |
| Zinc oxide | 0.3 |
| d,l-methionine | 1.5 |
| Vitamin premix | 10.0 |
| Total: | 2000.3 |

10 lb. of the vitamin composition contain: 16,000,-000 I.U. Vit. A, 1,000,000 I.U. Vit. $D_3$, 5,000 I.U. Vit. E acetate 6 g Vit. $K_3$, 6 mg Vit. $B_{12}$, 3 g riboflavin, 30 g niacin, 5 g calcium pantothenate and 100 g ethoxyquin, made up to 10 lb. with corn meal.

The 6,7-bis-cyclopropylmethoxy-4-hydroxy-3-quinoline-carboxylic acid ethyl ester is first premixed with about 1 kg of the finely ground feed mixture (which is supplied as such by the manufacturer). The premix is increased to about 25 kg with the feed and then thoroughly mixed with the main batch in a horizontal mixer.

EXAMPLE 4

A poultry feed containing 0.004 and 0.006% each of two active ingredients:

| Premix: | | |
|---|---|---|
| I. | 6,7-bis-cyclopropylmethoxy-4-hydroxy-3-quinolinecarboxylic acid ethyl ester | 40.0 g |
| II. | 5-(2,4-dimethyl-pyridinium)-methyl-4-amino-2-cyclopropylmethyl-pyrimidine chloride hydrochloride | 60.0 g |
| III. | Confectioners Sugar | 50.0 g |
| IV. | Soybean Feed, solvent extracted | 275.0 g |
| Feed Formula: | | Pounds |
| Corn meal | | 1103.0 |
| Soybean meal, 44% protein | | 660.0 |

| | |
|---|---|
| Alfalfa meal | 30.0 |
| Dicalcium phosphate | 40.0 |
| Limestone meal | 10.0 |
| Salt | 5.0 |
| Fish meal, 60% protein | 40.0 |
| Stabilized fat | 60.0 |
| Dried whey | 40.0 |
| Manganese sulfate | 0.5 |
| Zinc oxide | 0.3 |
| d,l-methionine | 1.5 |
| Vitamin premix | 10.0 |
| Total | 2000.3 |

10 lb. of the vitamin composition contain: 16,000,000 I.U. Vit. A, 1,000,000 I.U. Vit. $D_3$, 5,000 I.U. Vit. E acetate, 6 g Vit. $K_3$, 6 mg Vit. $B_{12}$, 3 g riboflavin, 30 g niacin, 5 g calcium pantothenate and 100 g ethoxyquin, made up to 10 lb. with corn meal.

The premix is prepared by triturating I and II with III and the mixture is then screened through a 30 mesh screen, U. S. standard sieve size. The screened material is then blended with IV in a mixer, the thoroughly mixed ingredients are added to 999.5 kg of the above feed formula and the whole is homogenized in a horizontal mixer.

EXAMPLE 5

A poultry feed containing 0.004 and 0.001% each of two active ingredients:

Premix:
| | | |
|---|---|---|
| I. | 6,7-bis-cyclopropylmethoxy-4-hydroxy-3-quinoline-carboxylic acid ethyl ester | 40.0 g |
| II. | 5-(2,4-dimethyl-pyridinium)-methyl-4-amino-2-cyclopropyl-pyrimidine chloride hydrochloride | 10.0 g |
| III. | Soybean Oil | 18.0 g |
| IV. | Corn Gluten Feed | 282.0 g |

About one third of the amount of IV is combined with I and II, mixed and then screened through a 30 mesh screen, U.S. standard sieve. The remainder of IV is then put into a mixer, III is added and the materials mixed to form a uniform dispersion to which the screened material is added and then mixed until uniformity is obtained. The resulting mixture is then added to 999 kg of the feed formula shown in Example 9 and the whole is homogenized in a horizontal mixer.

EXAMPLE 6

A poultry feed is prepared as follows:

Premix:
| | | |
|---|---|---|
| I. | 6,7-bis-cyclopropylmethoxy-4-hydroxy-3-quinolinecarboxylic acid ethyl ester | 100.0 g |
| II. | N'-(2-quinoxalinyl)-sulfanilamide | 125.0 g |
| III. | Confectioners Sugar | 150.0 g |
| IV. | Soybean Feed, solvent extracted | 570.0 g |

The premix is prepared by triturating I and II with III and the mixture is then screened through a 30 mesh screen, U. S. standard sieve size; the screened material is then blended with IV in a mixer and the thoroughly mixed ingredients are added to 9999 kg of the feed formula shown in Example 9 and the whole is homogenized in a horizontal mixer.

The above examples may otherwise be modified so as to obtain a poultry feed containing about 0.001 to 0.02 percent of the active component shown in Examples 1 to 6 alone or in admixture with another therapeutic agent, e.g. a sulfonamide, which may be present in an amount between about 0.001 and 0.01 percent, for the intended purposes. In preparing the premix materials (or feed-stuff additives respectively) in the above-identified examples one may, of course, substitute an equivalent amount of other carriers or nutrients respectively, such as cottonseed meal, linseed meal, oatmeal and the like.

EXAMPLE 7

A feed, prepared analogous to that described in Example 8 and containing 6,7-bis-cyclopropylmethoxy-4-hydroxy-3-quinoline-carboxylic acid ethyl ester at a level between 0.004 and 0.008 percent, is fed to broilers of the breed Peterson male crossed with Arbor Acres female, for 9 days during which time they are exposed to *Eimeria acervulina*. Their weight gain is compared with that of untreated, non-infected or with *Eimeria acervulina* infected birds, whereby each group contains 40 birds. The results are shown in the following table:

| Birds | %Level in feed | %Weight gain |
|---|---|---|
| untreated non-infected | 0 | 100 |
| untreated infected | 0 | 49 |
| treated non-infected | 0.008 | 106 |
| treated infected | 0.006 | 105 |
| treated infected | 0.004 | 105 |

EXAMPLE 8

The mixture of 5.0 g 6,7-bis-cyclopropylmethoxy-4-hydroxy-3-quinolinecarboxylic acid ethyl ester and 29 ml 10 percent aqueous sodium hydroxide is refluxed for 1 hour. After cooling, it is acidified with 6N hydrochloric acid, the precipitate formed filtered off and washed with water, to yield the 6,7-bis-cyclopropylmethoxy-4-hydroxy-3-quinolinecarboxylic acid of the formula

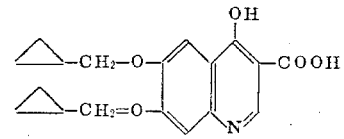

melting at 260°–263°.

The mixture of 1.0 g thereof, 0.507 ml 6N aqueous sodium hydroxide and 20 ml water is heated to 100° for 30 minutes. After cooling, toluene is added to the solution in order to coagulate the corresponding sodium salt formed, which is filtered off, washed with hot toluene and dried in vacuo; it decomposes at about 280°.

EXAMPLE 9

According to the process shown in the previous Examples, advantageously according to method a), the following compounds are prepared from equivalent amounts of the corresponding starting materials:
6-n-, i- or tert. butyl-7-cyclopropylmethoxy-4-hydroxy-3-quinoline-carboxylic acid methyl and ethyl ester, 6-n-butyl-7-(2,3-dichloro-cyclopropyl)-methoxy-4-hydroxy-3-quinolinecarboxylic acid methyl and ethyl ester, 6-dimethylamino-7-cyclopropylmethoxy-4-hydroxy- 3-quinolinecarboxylic acid methyl and ethyl ester, 7-cyclopropyl-methoxy-4-hydroxy-3-quinolinecarboxylic acid methyl and ethyl ester, 6- chloro-7-cyclopropylmethoxy-4-hydroxy-3-quinolinecarboxylic acid methyl and ethyl ester, 7-chloro-6-cyclopropylmethoxy-4-hydroxy-3-quinolinecarboxylic acid methyl and ethyl ester, 6-cyclopropylmethoxy-7-benzyloxy-4-hydroxy-3-quinolinecarboxylic acid methyl and ethyl ester, 6-cyclopropylmethoxy-7-benzyl-4-hydroxy-3-quinolinecarboxylic acid methyl and ethyl ester, 6-n-butyl-7-cyclohex-1-enylmethoxy-4-hydroxy-3-quinolinecarboxylic acid methyl and ethyl ester, 6-cyclobutylmethoxy-7-diethylamino-4-hydroxy-3-quinolinecarboxylic acid methyl and ethyl ester, 6-cyclopropylmethoxy-7-(2-chloroethoxy)-4-hydroxy-3-quinoline-carboxylic acid methyl and ethyl ester, 6-(2-chloro-cyclopropyl)-methoxy-7-i-butoxy-4-hydroxy-3-quinolinecarboxylic acid methyl and ethyl ester, 6-cyclopentoxy-7-(3,3,3-trifluoropropoxy)-4-hydroxy-3-quinolinecarboxylic acid methyl and ethyl ester, 6-cyclopropylmethoxy-7-phenoxy-4-hydroxy-3-quinolinecarboxylic acid methyl and ethyl ester, 6-n-butyl-7-(2,3-dimethyl-cyclopropyl)-methoxy-4-hydroxy-3-quinolinecarboxylic acid methyl and ethyl ester, 6,7-bis-(2-methyl-cyclopropyl)-methoxy-4-hydroxy-3-quinolinecarboxylic acid methyl and ethyl ester, 2-methyl-6-cyclopentylmethoxy-7-i-propoxy-4-hydroxy-3-quinolinecarboxylic acid methyl and ethyl ester, 6,7-bis-(2-cyclopropyl-ethoxy)-4-hydroxy-3-quinolinecarboxylic acid methyl and ethyl ester, 7-(3,4-dichloro-cyclopentoxy)-4-hydroxy-3-quinolinecarboxylic acid methyl and ethyl ester, 6-nitro-7-(4-cyclopropyl-butoxy)-4-hydroxy-3-quinolinecarboxylic acid methyl and ethyl ester, 7-(1-cyclopentenyl)-methoxy-4-hydroxy-3-quinolinecarboxylic acid methyl and ethyl ester, 7-(2-cyclohexenyloxy)-4-hydroxy-3-quinolinecarboxylic acid methyl and ethyl ester, 6-i-butyl-7-cyclopropylmethylmercapto-4-hydroxy-3-quinolinecarboxylic acid methyl and ethyl ester, 6-cyclopentylmercapto-4-hydroxy-3-quinolinecarboxylic acid methyl and ethyl ester, 6-n-butyl-7-(2,4-cyclopentadienyl)-methoxy-4-hydroxy-3-quinolinecarboxylic acid methyl and ethyl ester, 6-cyclopropylmethoxy-7-benzylmercapto-4-hydroxy-3-quinolinecarboxylic acid methyl and ethyl ester. 6-n-butyl-7-(2,2-dimethylcyclopropylmethoxy)-4-hydroxy-3-quinolinecarboxylic acid methyl and ethyl ester, 7-n-butyl-6-(2,2-dimethylcyclopropylmethoxy)-4-hydroxy-3-quinoline-carboxylic acid methyl and ethyl ester, 6-n-butyl-7-(1-methyl-cyclopropylmethoxy)-4-hydroxy-3-quinolinecarboxylic acid methyl and ethyl ester, 7-n-butyl-6-(1-methylcyclopropylmethoxy)-4-hydroxy-3-quinolinecarboxylic acid methyl and ethyl ester, 7-n-butyl-6-(2-methylcyclopropylmethoxy)-4-hydroxy-3-quinolinecarboxylic acid methyl and ethyl ester, 6-n-butyl-7-(1-acetoxymethylcyclopropylmethoxy)-4-hydroxy-3-quinolinecarboxylic acid methyl and ethyl ester, 7-n-butyl-6-(1-acetoxymethylcyclopropylmethoxy)-4-hydroxy-3-quinolinecarboxylic acid methyl and ethyl ester, 6-n-butyl-7-(2-phenoxycyclopropylmethoxy)-4-hydroxy-3-quinoline-carboxylic acid methyl and ethyl ester, 7-n-butyl-6-(2-phenoxy)-cyclopropylmethoxy)-4-hydroxy-3-quinolinecarboxylic acid methyl and ethyl ester, 6-n-butyl-7-(2,2-dichlorocyclopropylmethoxy)-4-hydroxy-3-quinolinecarboxylic acid methyl and ethyl ester, 7-n-butyl-6-(2,2-dichlorocyclopropylmethoxy)-4-hydroxy-3-quinoline-carboxylic acid methyl and ethyl ester, 6-n-butyl-7-(1-chloro-methylcyclopropylmethoxy)-4-hydroxy-3-quinolinecarboxylic acid methyl and ethyl ester, 7-n-butyl-6-(1-chloromethylcyclopropylmethoxy)-4-hydroxy-3-quinolinecarboxylic acid methyl and ethyl ester, 6-n-butyl-7-(1-methoxymethylcyclopropylmethoxy)-4-hydroxy-3-quinolinecarboxylic acid methyl and ethyl ester, 6-n-butyl-7-(2-methyl-cyclopropylmethoxy)-4-hydroxy-3-quinolinecarboxylic acid methyl and ethyl ester, 7-n-butyl-6-(1-methoxymethyl-cyclopropylmethoxy)-4-hydroxy-3-quinolinecarboxylic acid methyl and ethyl ester, 6-n-butyl-7-(1phenylcyclopropylmethoxy)-4-hydroxy-3-quinolinecarboxylic acid methyl and ethyl ester, 7-n-butyl-6-(1-phenylcyclopropylmethoxy)-4-hydroxy-3-quinolinecarboxylic acid methyl and ethyl ester, 6-n-butyl-7-(1,2-dimethylcyclopropylmethoxy)-4-hydroxy-3-quinolinecarboxylic acid methyl and ethyl ester, 7-n-butyl-6-(1,2-dimethylcyclopropylmethoxy)-4-hydroxy-3-quinolinecarboxylic acid methyl and ethyl ester, 7-n-butyl-6-(2,3-dimethylcyclopropylmethoxy)-4-hydroxy-3-quinolinecarboxylic acid methyl and ethyl ester, 6-n-butyl-7-(1,2,2-trimethylcyclopropylmethoxy)-4-hydroxy-3-quinolinecarboxylic acid methyl and ethyl ester, 7-n-butyl-6-(1,2,2-trimethylcyclopropylmethoxy)-4-hydroxy-3-quinolinecarboxylic acid methyl and ethyl ester, 6-n-butyl-7-(1,2,3-trimethylcyclopropylmethoxy)-4-hydroxy-3-quinolinecarboxylic acid methyl and ethyl ester, 7-n-butyl-6-(1,2,3-trimethylcyclopropylmethoxy)-4-hydroxy-3-quinoline-carboxylic acid methyl and ethyl ester, 6-n-butyl-7-(2-ethoxy-cyclopropylmethoxy)-4-hydroxy-3-quinolinecarboxylic acid methyl and ethyl ester, 7-n-butyl-6-(2-ethoxycyclopropylmethoxy)-4-hydroxy-3-quinolinecarboxylic acid methyl and ethyl ester.

EXAMPLE 10

Feed additive containing 50% of the active ingredient.

Formula:
| | |
|---|---|
| 6,7-Bis-cyclopropylmethoxy-4-hydroxy-3-quinolinecarboxylic acid ethyl ester | 500.0 g |
| Stearyl alcohol | 250.0 g |
| Glyceryl monostearate | 250.0 g |

Procedure:

The stearyl alcohol and glyceryl monostearate are melted and the finely divided active ester suspended therein, using a turbo stirrer. The mixture is allowed to congeal on a cooled flaking drum and the flakes are passed through a screen having 0.6 mm openings.

This additive, releasing the active substance in the lower part of the chicken's intestine, is added to regular poultry feed in such amount as to obtain a concentration of the active ester therein between about 0.001 and 0.005 percent.

EXAMPLE 11

Feed additive containing 15% of the active ingredient.

Formula:
| | |
|---|---|
| 6,7-Bis-cyclopropylmethoxy-4-hydroxy-3-quinolinecarboxylic acid ethyl ester | 75.0 g |
| Additive of Example 28 | 150.0 g |
| Soybean meal (particle size less than 0.6 mm) | 775.0 g |

Procedure:

All the powders are mixed well in a V-shaped mixer and passed through a screen having 0.6 mm openings.

This additive, releasing the active substance in the upper and lower parts of the chicken's intestine, is added to regular poultry feed in an amount to obtain a concentration of the active ester therein between about 0.001 and 0.005 percent.

EXAMPLE 12

The mixture of 23.5 g diethyl (3-n-butyl-4-cyclopropyl-methoxy-phenylamino)-methylene-malonate and 140 ml of the eutectic mixture of biphenyl and diphenyl ether is refluxed for 11 minutes (250°–260°). It is cooled quickly, diluted with petroleum ether and stirred for 1 hour at room temperature. The precipitate formed is filtered off, washed with petroleum ether and dried in vacuo at 100°, to yield the 6-cyclopropylmethoxy-7-n-butyl-4-hydroxy-3-quinolinecarboxylic acid ethyl ester of the formula

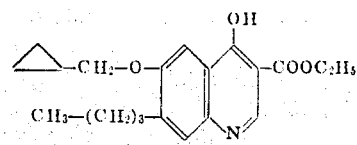

melting at 259°–261° with decomposition.

In the analogous manner, the corresponding methyl ester, m.p. 257°–259° (dec.) is prepared.

The starting material is prepared as follows: To the mixture of 60 g 4-acetamido-phenol and 200 ml pyridine, 44 g butyryl chloride are added while chilling and stirring. After stirring for 3 hours, it is poured into twice of its volume of water and the precipitate formed filtered off and washed with water, to yield the 4-butyryloxy-acetanilide melting at 145°–146°.

The intimate mixture of 65.3 g thereof and 79 g anhydrous aluminum chloride is heated slowly to 175° while stirring. After ½ hour mixing, the melt is cooled, ground in a mortar and reheated for 2–½ hours to 175°. After cooling, the mixture is added to 500 g ice and 200 ml 2N sulfuric acid while stirring. The precipitate formed is filtered off, washed with water, dissolved in the minimum amount of 5 percent aqueous sodium hydroxide and the solution filtered. The filtrate is acidified with acetic acid, the precipitate formed filtered off, washed with water and recrystallized from benzene, to yield the 3-butyryl-4-hydroxy-acetanilide melting at 100°–102°.

The mixture of 45.8 g thereof, 500 ml glacial acetic acid and 15 g 10% palladium on charcoal is hydrogenated at 500 p.s.i. and 25°. After the theoretical amount of hydrogen has been absorbed, it is filtered, the filtrate evaporated in vacuo, and the residue triturated with n-hexane, to yield the 3-n-butyl-4-hydroxy-acetanilide melting at 83°–85°.

The solution of 37.5 g thereof in 100 ml dimethylformamide is added during ½ hour to the suspension of 8.2 g 55.7 percent of sodium hydride in mineral oil and 100 ml dimethylformamide while stirring under nitrogen and cooling. After stirring for 1 hour, 43.0 g cyclopropylmethyl bromide are added during 20 minutes and allowing the temperature to rise to 50°. The mixture is stirred for 7 hours at 75°, it is filtered and the filtrate evaporated in vacuo The residue is triturated with petroleum ether, to yield the 3-n-butyl-4-cyclopropylmethoxy-acetanilide melting at 65°–67°.

The mixture of 54 g thereof and 540 ml Claisen's alkali is heated at the steam bath for 7 hours. It is cooled, poured into 1 liter ice water while stirring, and the mixture is extracted with methylene chloride. The extract is dried and evaporated, to yield the 3-n-butyl-4-cyclopropylmethoxy-aniline.

The mixture of 12.5 g thereof, 100 ml anhydrous ethanol and 12.3 g diethyl ethoxymethylene-malonate is refluxed for 3 hours and evaporated in vacuo, to yield the diethyl (3-n-butyl-4-cyclo-propylmethoxy-phenylamino)-methylene-malonate, which is used as such without further purification.

EXAMPLE 13

55 g of diethyl (3-cyclopropylmethoxy-4-n-nonyl-phenyl-amino)-methylene-malonate are added to the boiling eutectic mixture of diphenyl ether and biphenyl, and the whole is refluxed for 10 minutes. After cooling, it is diluted with pentane, the precipitate formed filtered off and washed with pentane, to yield the 6-n-nonyl-7-cyclopropylmethoxy-4-hydroxy-3-quinolinecarboxylic acid ethyl ester of the formula

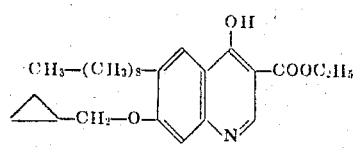

melting at 253° with decomposition.

The starting material is prepared as follows: To the mixture of 60 g 3-hydroxy-acetanilide and 350 ml pyridine, 70.6 g nonanoyl chloride are added while cooling and stirring, and the mixture is allowed to stand for 1 hour at room temperature. It is chilled in an ice bath for ½ hour, filtered and the filtrate evaporated in vacuo. The residue is taken up in benzene, the solution dried, evaporated, and the residue triturated with n-pentane, to yield the 3-nonanoyloxy-acetanilide melting at 43°–45°.

The mixture of 98 g thereof and 103 g aluminum chloride is heated to 50° for ½ hour, cooled, ground and heated for 2 hours to 160°–170°. The cooled, ground material is added to 1 liter 2N sulfuric acid while stirring for 1–½ hours, the precipitate formed is filtered off, washed with water, dissolved in 1 liter 10 percent aqueous sodium hydroxide, the mixture filtered and the filtrate acidified with 20 percent hydrochloric acid while chilling. The precipitate is filtered off, washed with water, to yield the 3-hydroxy-4-nonanoyl-acetanilide melting at 105°–107°.

The mixture of 54.5 g thereof, 500 ml glacial acetic acid and 18.2 g 10 percent palladium on charcoal is hydrogenated at 500 p.s.i. and 25° until the theoretical amount of hydrogen has been absorbed. It is filtered, the filtrate evaporated in vacuo and the residue recrystallized from benzene, to yield the 3-hydroxy-4-n-nonylacetanilide melting at 120°–123°.

The solution of 32 g thereof in 250 ml dimethylformamide is added during 1 hour to the suspension of 5 g 56 percent sodium hydride in mineral oil and 250 ml dimethylformamide while stirring under nitrogen, and stirring is continued for 2 hours. Hereupon 28 g 87 percent cyclopropylmethyl bromide are added during 10 minutes and the mixture stirred for 2 hours at room temperature and for 8 hours at 75°. The mixture is evaporated in vacuo, the residue taken up in hexane, the solution filtered and the filtrate evaporated, to yield the oily 3-cyclopropylmethoxy-4-n-nonyl-acetanilide.

The mixture of 45 g thereof and 450 ml Claisen's alkali is refluxed for 3 hours, cooled and poured into 500 ml ice water. After stirring for ½ hour, the mixture is extracted with methylene chloride, the extract dried and evaporated, to yield the 3-cyclopropylmethoxy-4-n-nonyl-aniline. It is taken up in 500 ml ethanol, 25.9 g diethyl ethoxymethylene-malonate are added and the whole refluxed for 4 hours. The mixture is evaporated in vacuo, the yield the diethyl (3-cyclopropylmethoxy-4-n-nonyl-phenylamino)-methylenemalonate, which is used as such without further purification.

EXAMPLE 14

18 g diethyl (3-n-tetradecyloxy-4-cyclopropylmethoxy-phenylamino)-methylene-malonate are added to 110 ml refluxing eutectic mixture of diphenyl ether and biphenyl, and the reflux is maintained for 8 minutes. The mixture is cooled quickly, diluted with hexane, the precipitate formed filtered off and washed with hexane, to yield the 6-cyclopropylmethoxy-7-n-tetradecyloxy-4-hydroxy-3-quinolinecarboxylic acid ethyl ester of the formula

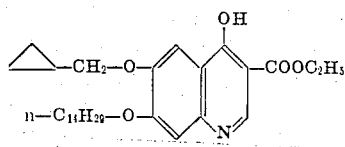

melting at 237°–238°.

The starting material is prepared in the manner described in the previous examples from equivalent amounts of the corresponding intermediates. These have the following physical data: 3-n-tetradecyloxy-4-cyclopropylmethoxy-nitrobenzene, m.p. 63°–64°. Diethyl (3-n-tetradecyloxy-4-cyclopropylmethoxy-phenylamino)-methylene-malonate, m.p. 56°–57°.

EXAMPLE 15

The mixture of 8.0 g diethyl (3-n-decyloxy-4-cyclopropylmethoxy-phenylamino)-methylene-malonate and 48 ml diphenyl ether is refluxed for 20 minutes under a stream of nitrogen. After cooling, the mixture is diluted with pentane, the precipitate formed filtered off and recrystallized from dimethylformamide, to yield the 6-cyclopropylmethoxy-7-n-decyloxy-4-hydroxy-3-quinoline-carboxylic acid ethyl ester of the formula

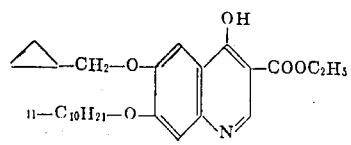

melting at 253°–254°.

In the analogous manner, the corresponding methyl ester is prepared, m.p. 254°–255°.

The starting material is prepared as follows: To the stirred solution of 55.0 g pyrocatechol in 250 ml anhydrous ethanol, 20.0 g sodium hydroxide are added while stirring, followed by 86.9 g cyclopropylmethyl bromide, which is added dropwise during 1 hour. The mixture is stirred and refluxed for 24 hours and concentrated to about ⅓ of the original volume. The concentrate is diluted with water, the mixture extracted with methylene chloride, the extract washed with water, dried, filtered, evaporated, the residue distilled and the fraction boiling at 90°–94°/0.4 mm Hg collected; it represents the pyrocatechol mono-cyclopropylmethyl ether.

The mixture of 28.3 g thereof, 6.8 g sodium hydroxide and 100 ml benzene is stirred and refluxed for ½ hour. After cooling, the precipitate formed is filtered off, resuspended in 300 ml benzene and to the ice-cooled mixture, 23.9 benzoyl chloride are added during ½ while stirring, and the mixture is stirred for 4 hours at 25°. It is washed with 200 ml 2 percent aqueous sodium hydroxide and 200 ml water, the organic layer separated, dried, filtered and evaporated. The residue is distilled and the fraction boiling at 173°–175°/0.3 mm Hg collected; it represents the 2-cyclopropylmethoxy-phenyl benzoate.

To the solution of 25.0 g thereof in 210 ml glacial acetic acid, 25.2 ml fuming nitric acid are added during ¼ hour at room temperature while stirring, and the mixture is heated to 100° for 20 minutes. It is poured into 200 ml ice water, the precipitate formed filtered off and recrystallized from isopropanol to yield the 2-cyclopropylmethoxy-5-nitro-phenyl benzoate melting at 96°–99°.

The mixture of 40.0 g thereof, 150 ml 95 percent ethanol and 11.5 g 50 percent aqueous sodium hydroxide is refluxed for 2 hours and evaporated in vacuo. The residue is taken up in 300 ml water, the solution acidified with 40 ml concentrated hydrochloric acid and extracted with 300 ml methylene chloride. The extract is stirred with 500 ml 10 percent aqueous sodium bicarbonate for 2 hours and the organic layer separated. The aqueous layer is extracted with methylene chloride, the combined organic solutions dried, filtered and evaporated. The residue is triturated with hexane, to yield the 3-hydroxy-4-cyclopropylmethoxy-nitrobenzene melting at 104°–105°.

The mixture of 18.0 g thereof, 130 ml toluene and 3.44 g sodium hydroxide is stirred and refluxed for 1 hour and evaporated in vacuo. The residue is taken up in 130 ml dimethylformamide, 0.4 g sodium iodide and 19.0 g n-decyl bromide are added and the mixture stirred under nitrogen for 17 hours at room temperature. It is diluted with 500 ml water, extracted with methylene chloride, the extract washed with water, dried, filtered and evaporated. The residue is recrystallized from n-hexane, to yield the 3-n-decyloxy-4-cyclopropylmethoxy-nitrobenzene, melting at 59°–61°.

The mixture of 10.5 g thereof, 100 ml anhydrous ethanol and 0.5 g platinum oxide is hydrogenated at 3 at and room temperature until the hydrogen uptake has ceased. To the mixture, 6.5 g diethyl ethoxymethylene-malonate are added and the whole is refluxed for 3 hours. The mixture is filtered hot an the filtrate evaporated in vacuo, to yield the diethyl (3-n-decyloxy-4-cyclopropylmethoxy-phenylamino)-methylene-malonate.

EXAMPLE 16

The mixture of 13 g diethyl (3-cyclopropylmethoxy-4-n-decyloxy-phenylamino)-methylene-malonate and 80 ml diphenyl ether is refluxed for 20 minutes, diluted with pentane after cooling and filtered. The precipitate is washed with ethanol, acetone and diethyl ether, to yield the 6-n-decyloxy-7-cyclopropylmethoxy-4-hydroxy-3-quinoline-carboxylic acid ethyl ester of the formula

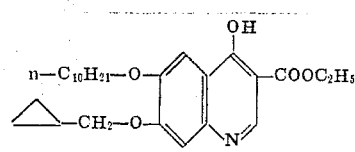

melting at 234°–235°.

The starting material is prepared as follows: To the mixture of 22 g pyrocatechol, 200 ml acetone and 50 g anhydrous potassium carbonate, 46.4 g n-decyl bromide are added while stirring and the mixture refluxed under nitrogen for 36 hours. It is filtered, the filtrate evaporated in vacuo, the residue distilled and the fraction boiling at 140°–144°/0.4 mmHg collected; it represents the pyrocatechol mono-n-decyl ether. About the same amount of pyrocatechol di-n-decyl ether is also obtained, b.p. 198°–200°/0.3 mmHg.

The mixture of 12 g of the mono ether, 1.9 g sodium hydroxide and 50 ml benzene is stirred and refluxed for ½ hour and evaporated. To the residue the mixture of 7.7 g benzoyl chloride and 150 ml benzene is slowly added while cooling and the mixture stirred at room temperature for 4 hours. It is washed with 200 ml 2 percent aqueous sodium hydroxide and water, dried, filtered and evaporated in vacuo. The residue is distilled and the fraction boiling at 175°–180°/0.1 mmHg collected; it represents the 2-n-decyloxy-phenyl benzoate.

11.8 g thereof are dissolved in 100 ml glacial acetic acid and 12 ml fuming nitric acid are added dropwise while stirring. The mixture is heated at the steam bath for 20 minutes, then cooled to 30° and slowly added to 125 ml ice water. The mixture is extracted with methylene chloride, the extract washed with water, dried, filtered and evaporated to yield the 2-n-decyloxy-5-nitro-phenyl benzoate.

The mixture of 78 g thereof, 235 ml ethanol and 18 g 50 percent aqueous sodium hydroxide is refluxed for 2-½ hours and evaporated in vacuo. The residue is taken up in 200 ml water, the solution acidified with 50 ml concentrated hydrochloric acid and extracted with methylene chloride. The extract is washed with 10 percent aqueous sodium bicarbonate and water, dried, filtered and evaporated, to yield the 3-hydroxy-4-n-decyloxy-nitrobenzene melting at 53°–54°. The mixture of 12.5 g thereof, 85 ml toluene, 1.7 g sodium hydroxide, 0.18 g sodium iodide and 85 ml dimethyl formamide is stirred and refluxed for 1 hour. Hereupon 10.2 g 85 percent cyclopropylmethyl bromide are added dropwise while stirring, and the mixture stirred at 120° for 24 hours. It is diluted with water, extracted with methylene chloride, the extract washed with water, dried, filtered and evaporated. The residue is recrystallized from n-hexane, to yield the 3-cyclopropylmethoxy-4-n-decyloxy-nitrobenzene melting at 61°–62°.

The mixture of 12 g thereof, 200 ml anhydrous ethanol and 0.8 g platinum oxide, is hydrogenated at 3 at and room temperature until the hydrogen uptake has ceased. The mixture is combined with 7.4 g diethyl ethoxymethylene-malonate and the whole stirred and refluxed for 3 hours. The mixture is filtered hot and the filtrate evaporated in vacuo, to yield the diethyl (3-cyclopropylmethoxy-4-n-decyloxy-phenylamino)-methylene-malonate.

EXAMPLE 17

Feed additive containing 15% of the active ingredient

| Formula | |
|---|---|
| 6-cyclopropylmethoxy-7-n-decyloxy-4-hydroxy-3-quinolinecarboxylic acid ethyl ester | 500.0 g |
| stearyl alcohol | 250.0 g |
| glyceryl monostearate | 250.0 g |
| soybean meal | 2,330.0 g |

Procedure:

The stearyl alcohol and stearate are melted and the active ester suspended therein, using a turbo stirrer. The mixture is allowed to congeal on cooled flaking drum and the flakes are passed through a screen having 0.6 mm openings. They are mixed with soybean meal in a V-shaped mixer and the whole is screened through 0.6 mm openings.

This additive releasing the active substance in the upper and lower parts of the chicken's intestine is added to regular poultry feed in an amount to obtain a concentration of the active ester therein between about 0.0001 to 0.0075 percent.

EXAMPLE 18

12.8 g diethyl (3-n-dodecyloxy-4-cyclopropylmethoxy-phenylamino)-methylene-malonate are added to 75 ml refluxing diphenyl ether and the mixture is refluxed for 30 minutes. It is cooled, diluted with pentane and filtered. The residue is washed with pentane to yield the 6-cyclopropylmethoxy-7-n-dodecyloxy-4-hydroxy-3-quinoline-carboxylic acid ethyl ester of the formula

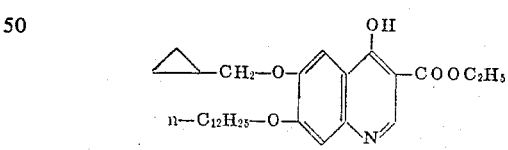

melting at 210°–213°.

The starting material is prepared as follows: The mixture of 5.0 g 3-hydroxy-4-cyclopropylmethoxy-nitrobenzene, 35 ml toluene, and 0.92 g sodium hydroxide is stirred and refluxed for 1 hour under nitrogen and evaporated in vacuo. The residue is taken up in 35 ml dimethylformamide, 0.1 g sodium iodide and 5.73 g n-dodecyl bromide are added and the mixture stirred for 40 hours under nitrogen at 120°. It is cooled, diluted with 100 ml water, extracted with methylene chloride, the extract dried, filtered and evaporated to yield the 3-n-dodecyloxy-4-cyclopropylmethoxy-nitrobenzene.

The mixture of 9 g thereof, 150 ml anhydrous ethanol and 0.5 g platinum oxide is hydrogenated at 3 at and room temperature until the hydrogen uptake has ceased. Hereupon 5.0 g diethyl ethoxymethylene-malonate are added and the mixture refluxed for 5 hours under nitrogen. It is filtered and the filtrate evaporated in vacuo, to yield the diethyl (3-n-dodecyloxy-4-cyclopropylmethoxy-phenylamino)-methylene-malonate melting at 67°.

EXAMPLE 19

Feed additive containing 15% of the active ingredient.

Formula:
| | |
|---|---:|
| 6,7-bis-cyclopropylmethoxy-4-hydroxy-3-quinolinecarboxylic acid ethyl ester | 24.75 kg |
| Lecithin, Soybean | 1.65 kg |
| Soybean Oil | 1.65 kg |
| Corn Gluten Feed | 136.95 kg |

Procedure:

The corn gluten feed is ground in a Tornado Mill and passed through a screen with 0.85 mm openings. 25 kg thereof are mixed with the micronized active ester and the whole passed through a screen of the same size. The remainder of the feed is mixed with the soybean oil and lecithin, whereupon the premix is added, and the whole is blended for at least 20 minutes until homogeneous. This additive is combined with regular poultry feed, e.g. such described in Examples 8 and 9, in order to obtain a medicated feed containing between about 0.004 and 0.008 percent of the active ester.

EXAMPLE 20

The mixture of 10.0 g diethyl (3-n-octyloxy-4-cyclopropylmethoxy-phenylamino)-methylene-malonate and 65 ml diphenyl ether is refluxed for 20 minutes under a stream of nitrogen. After cooling, the mixture is diluted with pentane, the precipitate formed filtered off and recrystallized from dimethylformamide, to yield the 6-cyclopropylmethoxy-7-n-octyloxy-4-hydroxy-3-quinoline-carboxylic acid ethyl ester of the formula

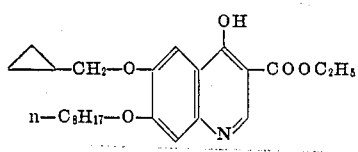

melting at 256°–258°.

In the analogous manner, the corresponding methyl ester is prepared, m.p. 258°–259.5°.

The starting material is prepared as follows: The mixture of 36 g 3-hydroxy-4-cyclopropylmethoxy-nitrobenzene, 260 ml toluene and 6.88 g sodium hydroxide is stirred and refluxed for 1 hour and evaporated in vacuo. The residue is taken up in 260 ml dimethylformamide, 0.15 g sodium iodide and 38 g n-octyl bromide are added and the mixture stirred under nitrogen for 29 hours at 120° bath temperature. It is diluted with 500 ml water, extracted with methylene chloride, the extract washed with water, dried, filtered and evaporated. The residue is recrystallized from n-hexane, to yield the 3-n-octyloxy-4-cyclopropylmethoxy-nitrobenzene, melting at 48°–49°.

The mixture of 9 g thereof, 100 ml anhydrous ethanol and 0.5 g platinum oxide is hydrogenated at 3 at and room temperature until the hydrogen uptake has ceased. To the mixture, 6.1 g diethyl ethoxymethylene-malonate are added and the whole is refluxed for 3 hours. The mixture is filtered hot and the filtrate evaporated in vacuo, to yield the diethyl (3-n-octyloxy-4-cyclopropylmethoxy-phenylamino)-methylene-malonate.

EXAMPLE 21

The mixture of 3.19 g 6,7-bis-cyclopropylmethoxy-4-hydroxy-3-quinolinecarboxylic acid ethyl ester, 1.91 g anhydrous sodium acetate and 80 ml acetic anhydride is slowly heated to the boil while stirring and refluxed for 2 hours and 20 minutes. After cooling, it is filtered, the filtrate poured into 400 ml water while stirring and the mixture allowed to stand at room temperature for 2 hours. The precipitate formed is filtered off, washed with water, dried and recrystallized from isopropanol with the aid of charcoal, to yield the 6,7-bis-cyclopropylmethoxy-4-acetoxy-3-quinolinecarboxylic acid ethyl ester of the formula

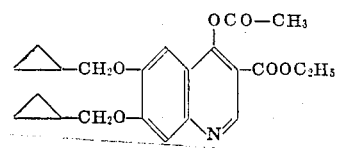

melting at 137°–138°.

EXAMPLE 22

The stirred mixture of 0.6 g 6-cyclopropylmethoxy-7-n-decyloxy-4-hydroxy-3-quinoline-carboxylic acid ethyl ester, 1.5 g anhydrous sodium acetate and 15 ml acetic acid anhydride is refluxed for three hours and evaporated in vacuo. The residue is triturated with methylene chloride, the solution evaporated and the residue recrystallized from diethyl ether-pentane, to yield the 6-cyclopropylmethoxy-7-n-decyloxy-4-acetoxy-3-quinoline-carboxylic acid ethyl ester of the formula

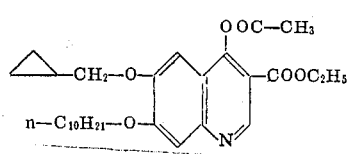

melting at 101.5°–102°.

EXAMPLE 23

According to the method described in Examples 11, 17 or advantageously, 19, a poultry feed additive can be prepared, containing 15 percent of the following active ingredients:

1. 6-cyclopropylmethoxy-7-n-(octyloxy, decyloxy, dodecyloxy or tetradecyloxy)-4-hydroxy-3-quinolinecarboxylic acid, methyl or ethyl ester;
2. 6-cyclopropylmethoxy-7-n-butyl-4-hydroxy-3-quinolinecarboxylic acid, methyl or ethyl ester;
3. 7-cyclopropylmethoxy-6-n-(nonyl or decyloxy)-4-hydroxy-3-quinolinecarboxylic acid, methyl or ethyl ester;
4. 6,7-bis-cyclopropylmethoxy-4-acetoxy-3-quinolinecarboxylic acid, methyl or ethyl ester.

Analogously, additives are prepared, containing 15 percent of the growth promoters mentioned under items a) to d) in the penultimate paragraph of the disclosure.

EXAMPLE 24

By mixing of corresponding amounts of the additives of Examples 10, 11 17 19 or 23 and the feed formula of Examples 3 or 4, a medicated chicken feed is prepared, comprising about 0.001 to 0.004 percent of the active ingredients, more particularly:

1. 0.001 percent 6-cyclopropylmethoxy-7-n-butyl-4-hydroxy-3-quinoline-carboxylic acid methyl ester or
2. 0.002 percent 6-cyclopropylmethoxy-7-n-dodecyloxy-4-hydroxy-3-quinoline-carboxylic acid ethyl ester or
3. 0.003 percent 6-cyclopropylmethoxy-7-(n-octyloxy or n-tetradecyloxy)-4-hydroxy-3-quinolinecarboxylic acid ethyl ester or
4. 0.003 percent 7-cyclopropylmethoxy-6-n-decyloxy)-4-hydroxy-3-quinoline-carboxylic acid ethyl ester or
5. 0.003 percent 6,7-bis-cyclopropylmethoxy-4-acetoxy-3-quinolinecarboxylic acid ethyl ester.

Analogously, chicken feed is prepared, comprising 0.002475 – 0.003 percent 6,7-bis-cyclopropylmethoxy-4-hydroxy-3-quinoline-carboxylic acid ethyl ester and:
a. 0.0025 percent 3-nitro-4-hydroxyphenylarsonic acid or
b. 0.005 percent arsanilic acid or
c. 0.0022 percent procaine penicillin or
d. 0.0022 percent bacitracin methylene disalicylate.

We claim:

1. A poultry feedstuff or additive therefor, consisting essentially of 1) a growth promoting and anticoccidially effective amount of a compound having having the formula

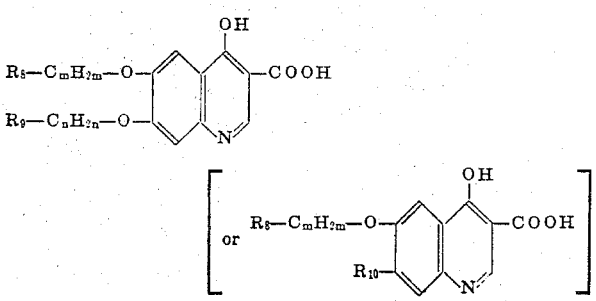

in which both of $R_8$ and $R_9$ stand for cyclopropyl and both of $m$ and $n$ for the same integer from one to four, or one of $R_8$ and $R_9$ stands for hydrogen and the other for cyclopropyl, the one of $m$ and $n$ present in the alkyl group for an integer from one to 16 and the other for the integer one, a lower alkyl or 4-alkanoic acid ester, or a therapeutically useful ammonium, alkali metal, alkaline earth metal or acid addition salt thereof, as the active ingredient and 2) a poultry nutrient.

2. A feedstuff or additive as claimed in claim 1, in which formula of the active ingredient one of $R_8$ and $R_9$ is hydrogen and the other is cyclopropyl, the one of $m$ and $n$ present in the alkyl group is an integer from eight to 16 and the other is the integer one, a lower alkyl or 4-alkanoic acid ester, or a therapeutically useful ammonium, alkali or alkaline earth metal or acid addition salt thereof.

3. A feedstuff or additive as claimed in claim 1, wherein the active ingredient is the 6,7-bis-cyclopropylmethoxy-4-hydroxy-3-quinolinecarboxylic acid methyl or ethyl ester or the 4-acetate thereof.

4. A feedstuff or additive as claimed in claim 1, wherein the active ingredient is the 6-cyclopropylmethoxy-7-n-(octyloxy, decyloxy, dodecyloxy or tetradecyloxy)-4-hydroxy-3-quinolinecarboxylic acid methyl or ethyl ester or the 4-acetate thereof.

5. A feedstuff or additive as claimed in claim 1, wherein the active ingredient is the 7-cyclopropylmethoxy-6-n-decyloxy-4-hydroxy-3-quinolinecarboxylic acid methyl or ethyl ester or the -acetate thereof.

6. A feedstuff as claimed in claim 1, containing about 0.0001 to 0.1 percent of the active ingredient in the poultry nutrient.

7. A feedstuff as claimed in claim 3, containing about 0.004 to 0.008 percent of the 6,7-bis-cyclopropylmethoxy-4-hydroxy-3-quinolinecarboxylic acid methyl or ethyl ester or the 4-acetate thereof in the poultry nutrient.

8. An additive as claimed in claim 1, containing about 1–75 percent of the active ingredient in the poultry nutrient.

9. An additive as claimed in claim 3, containing about 1–50 percent of the 6,7-bis-cyclopropylmethoxy-4-hydroxy-3-quinolinecarboxylic acid methyl or ethyl ester or the 4-acetate thereof in the poultry nutrient.

10. A feedstuff or additive as claimed in claim 1, in which formula of the active ingredient both of $R_8$ and $R_9$ are cyclopropyl and both of m and n are the same integer from 1 to 4, a lower alkyl or 4-alkanoic acid ester, or a therapeutically useful ammonium, alkali or alkaline earth metal or acid addition salt thereof.

11. A poultry feedstuff or additive therefore, consisting essentially of 1) a growth promoting and anticoccidially effective amount of a compound having the formula

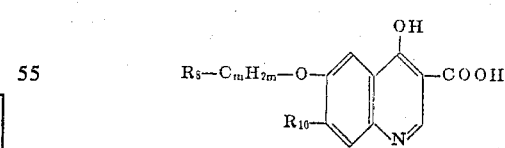

in which $R_8$ is cyclopropyl, $m$ is the integer one and $R_{10}$ is lower alkyl or di-lower alkylamino, a lower alkyl or 4-alkanoic acid ester, or a therapeutically useful ammonium, alkali or alkaline earth metal or acid addition salt thereof as the active ingredient and 2) a poultry nutrient.

12. A feedstuff or additive as claimed in claim 11 wherein the active ingredient is the 6-cyclopropylmethoxy-7-n-butyl-4-hydroxy-3- quinolinecarboxylic acid methyl or ethyl ester or the 4-acetate thereof.

13. A feedstuff as claimed in claim 11, containing about 0.0001 to 0.1 percent of the active ingredient in the poultry nutrient.

14. An additive as claimed in claim 11, containing about 1–75 percent of the active ingredient in the poultry nutrient.

* * * * *

UNITED STATES PATENT OFFICE
CERTIFICATE OF CORRECTION

PO-1050
(5/69)

Patent No. 3,761,592      Dated September 25, 1973

Inventor(s) RENAT HERBERT MIZZONI ET AL

It is certified that error appears in the above-identified patent and that said Letters Patent are hereby corrected as shown below:

Column 23, line 47, after "having" delete "having";

lines 55-60, delete bracketed formula;

Column 24, line 25, insert -- 4 -- before "-acetate".

Signed and sealed this 10th day of September 1974.

(SEAL)
Attest:

McCOY M. GIBSON, JR.
Attesting Officer

C. MARSHALL DANN
Commissioner of Patents